INVENTORS
H. B. IRVIN
P. H. WAGNER
BY
Young & Quigg
ATTORNEYS

INVENTORS
H. B. IRVIN
P. H. WAGNER

BY Young & Quigg

ATTORNEYS

United States Patent Office 3,681,308
Patented Aug. 1, 1972

3,681,308
STIRRED, SCRAPED-SURFACE APPARATUS AND PROCESS FOR TREATING MATERIALS THEREIN
Howard B. Irvin and Paul H. Wagner, Bartlesville, Okla., assignors to Phillips Petroleum Company
Original application Dec. 23, 1966, Ser. No. 604,286. Divided and this application Mar. 2, 1970, Ser. No. 15,859
Int. Cl. C08f 15/40
U.S. Cl. 260—80.78
4 Claims

ABSTRACT OF THE DISCLOSURE

A stirred, scraped-surface polymerization reactor comprising an outer jacketed shell, an inner jacketed, open-ended tube axially positioned in said shell to provide fluid flow between the surrounding annulus and said tube, stirring and scraping means in said annulus for removing solution film from the enclosing walls, and stirring and scraping means in said tube for removing film from the tube wall, is provided with separate and independent means for operating the annulus and the tube stirrer-scrapers for more efficient operation in solution polymerization.

---

Figure 1:
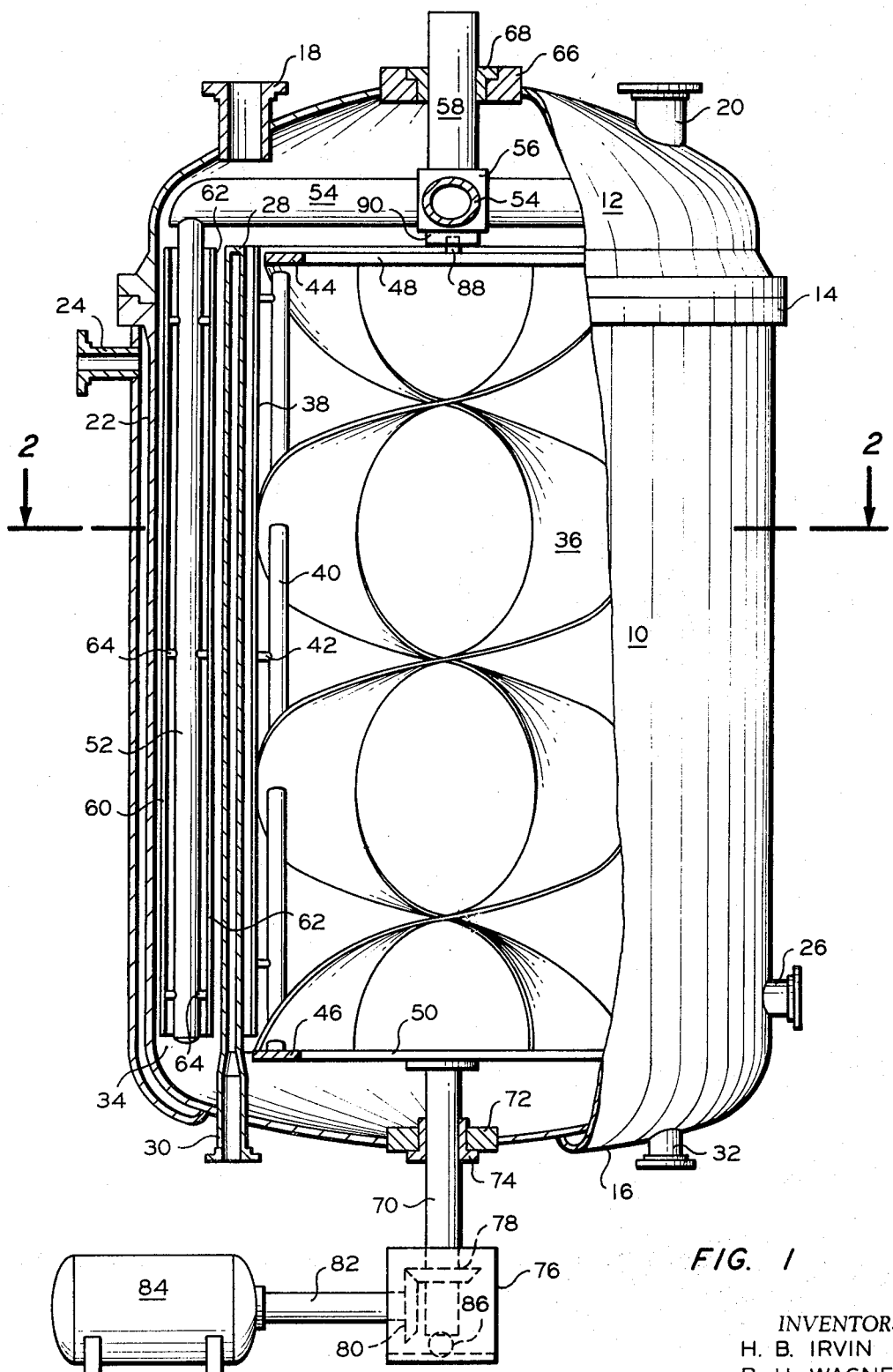

This application is a divisional of application Ser. No. 604,286 filed on Dec. 23, 1966 and now abandoned.

This invention relates to a stirred, jacketed, scraped-surface treater or reactor and to a method of treating materials therein.

The invention is concerned with an improvement in a stirred, scraped-surface, jacketed apparatus such as that disclosed in U.S. Patent 3,206,287. In operating this type of apparatus comprising an internal jacketed heat exchange tube axially positioned in a cylindrical jacketed shell and forming a substantial annulus therewith, with an axial scraping and impeller means within the tube and a second scraping means within the annulus, both operated on the same shaft, certain problems are encountered which have not thus far been solved by the prior art. When operating this type of apparatus of sizable diameter in effecting heat transfer and mixing of highly viscous materials, exorbitant horsepower requirements for rotating the scrapers in the annulus are encountered with sufficient rotational speed of the axial impeller and scraper for adequate mixing of the liquid material in the apparatus.

This invention is concerned with an improvement in the structure of such a stirred, scraped-surface, jacketed treater or reactor which eliminates the foregoing problem.

Accordingly, it is an object of the invention to provide a stirred, scraped-surface apparatus or reactor of improved structure having an internal axial jacketed tube within a jacketed cylindrical shell forming an annulus therewith and having an impeller and scraping means in the tube and a separate scraping means in the annulus. Another object is to provide an improved method or process for treating viscous liquids in a scraped-surface, jacketed heat exchanger of the character described. A further object is to provide an improved process for polymerizing polymerizable olefins by solution polymerization in a reactor of the character described. An additional object is to provide an apparatus and a process of the character described which permit flexibility of operation and better economy of operation. Other objects of the invention will become apparent to one skilled in the art upon consideration of the accompanying disclosure.

A broad aspect of the invention comprises a jacketed cylindrical shell having top and bottom closures, inlet and outlet means for fluids, and means for circulating heat exchange fluid through the shell jacket; a fixed jacketed cylindrical tube within the cylindrical shell concentric therewith and forming a substantial annulus therewith, said tube being shorter than the shell and spaced from the top and bottom closures to provide spaces at each end for open communication between said tube and said annulus; means for circulating heat exchange fluid through the jacket of the tube; scraper means rotatable concentrically within the annulus for scraping the inner wall of the shell and the outer wall of the tube and rotating means therefor; and impeller means provided with scraper means for the inner wall of said tube arranged concentrically therewith and rotatable independently of the scraper means in said annulus.

In treating viscous fluids while subjecting them to heat exchange, it is essential to the efficiency of the heat exchange operation to scrape the walls of the central heat exchange tube and the inner wall of the shell. When utilizing the apparatus for the polymerization of olefins and other polymerizable materials by solution polymerization in the presence of a particulate catalyst, it is desirable to operate the axial impeller at sufficient speed to provide good mixing and circulation through the tube and the annulus. Relatively high impeller speeds result in even higher linear speeds of the scraper in the annulus. In fact, in a reactor of the character described in U.S. Patent 3,206,287 which is of sizable diameter, such as at least 4 feet, the scraper means in the annulus operates at considerably higher speeds than are required for efficient heat exchange when operating the axial impeller at the required speed for good mixing of catalyst and monomer throughout the tube and annulus. The horsepower requirements for operating the annulus scraper in this situation are excessive and out of proportion to any benefit gained therefrom in the way of cooling efficiency. By operating the impeller and the annulus scraper means on different axes and independently of each other, the impeller speed can be maintained relatively high and the annular scraper means can be operated at a slower, more desirable rate from the standpoint of horsepower consumption so as to provide substantial economy of operation.

Process-wise, a broad aspect of the invention comprises operating the axial impeller and scraper in a scraped-surface heat exchanger of the character described at a substantially higher rotational speed than the rotational speed of the annulus scraper means. The axial tube impeller and scraper is operated at a rotational speed in the range of 2 to 100 times the rotational speed of the annulus scraper, depending upon the diameter of the heat exchanger and the relative diameters of the tube and annulus, as well as the character of the polymerization reaction or other heat exchange operation. The central or axial impeller-scraper is generally operated at a rotational speed in the range of about 25 to 250 r.p.m., depending upon the diameter of the axial tube, the capacity of the reactor or heat exchanger, and the type of process being effected therein.

The apparatus and process are particularly adapted to the polymerization of olefins, and particularly 1-olefins, utilizing a finely divided catalyst consisting essentially of chromium oxide (at least a portion thereof being in hexavalent form) distended on a porous support selected from the group silica, alumina, zirconia, thoria, and combinations thereof, using a diluent or solvent with substantial superatmospheric pressure to maintain a substantial proportion of the monomer in solution to form normally solid olefin polymer which remains in solution or suspension in the solvent or diluent within the reactor. The general polymerization process is described in Hogan and Banks U.S. Patent 2,825,721. The apparatus is particularly well adapted to effecting the high-solids polymerization process disclosed in the copending application of Joseph W. Davison S.N. 549,765, filed Apr. 25, 1966 and now abandoned, in which the polymer concentration in the reactor is maintained in the range of about 10 to 50 weight percent of the solution of polymer, preferably in the range of 20 to 40 weight percent.

Polymerization conditions conventional in the art are utilized and form no part of the instant invention. However, to illustrate the invention, ethylene is fed into a 2000 gallon reactor constructed in accordance with the invention at the rate of about 1448 pounds per hour at a temperature of approximately 100° F. Activated catalyst consisting essentially of chromium oxide (a portion being hexavalent) deposited on porous silica-alumina (2% alumina and chromium oxide concentration of about 2 weight percent) in finely divided form, 58 percent being less than 10 microns in size, is admixed with n-hexane (as the solvent feed) and the resulting catalyst slurry is fed to the reactor at the rate of 0.255 pound of catalyst and 1935 pounds of n-hexane per hour. By circulating cooling water through both jackets of the reactor, the temperature is maintained at about 340° F. and reactor pressure is controlled at about 465 p.s.i.a. Reaction effluent consists of 1380 pounds per hour of polyethylene dissolved in 1935 pounds of n-hexane solvent and 68 pounds of unreacted ethylene. The reactor, constructed with independently rotatable scraper and impeller means in the tube and scraper means in the annulus, has an internal shell diameter of 5.0 feet, an outer diameter of the axial tube of 3.34 feet, an internal diameter of the axial tube of 2.92 feet, and a tube length of 13.8 feet. The rotational speeds of the annulus scraper and the axial impeller-scraper are about 30 and 100 r.p.m., respectively.

The effluent solution of polymer containing about 40 weight percent polyethylene is fed to conventional evaporating means which removes substantially all of the solvent, leaving the catalyst in a concentration less than 0.02 weight percent in the product polymer.

The invention is applicable to processes other than polymerization wherein rapid heat exchange and mixing of viscous materials is required. Examples of such operations are those set forth in the aforesaid U.S. Patent 3,206,287 and include soap manufacture, grease-making, the bulk and solution polymerization of polymerizable monomeric materials or mixtures of such materials other than 1-olefins (e.g., styrene, isoprene, butadiene, vinyl chloride, etc.), the bodying of natural oils, such as tung oil, linseed oil, etc., and the like.

Figure 3:
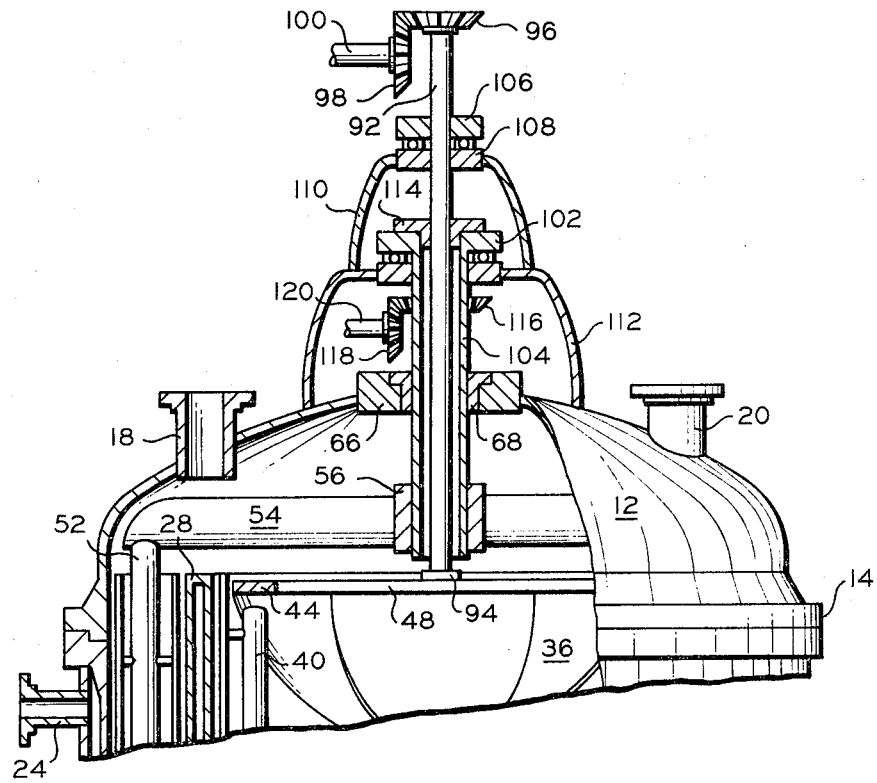
Figure 3:
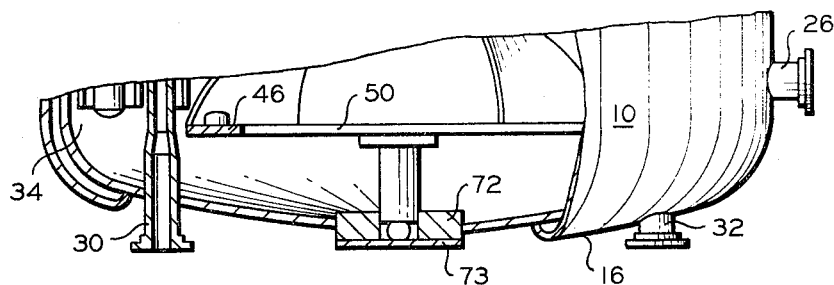
Figure 2:
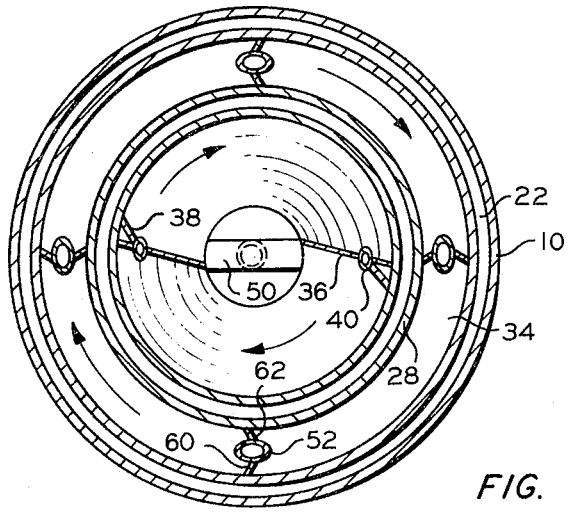

A more complete understanding of the invention may be had by reference to the accompanying schematic drawing of which FIG. 1 is an elevation in partial section of one embodiment of the invention; FIG. 2 is a cross section of the apparatus of FIG. 1 taken on the line 2—2; and FIG. 3 is a view similar to FIG. 1 illustrating another embodiment of the invention.

Referring to FIG. 1, a cylindrical jacketed shell 10 is provided with a top closure 12 attached thereto at flange 14 by bolts (not shown) and a bottom closure 16 welded to the shell or attached similar to closure 12, if desired. Top closure 12 is provided with an inlet 18 for a selected feed and an outlet 20 for withdrawal of treated material. Access for coolant to jacket 22 is provided by inlet 24 and outlet 26 provides withdrawal means for coolant. It is also feasible to introduce coolant through connection 26 and withdraw coolant from connection 24. An axial jacketed tube 28 is fixed within shell 10 and supported by inlet and outlet conduits or connections 30 and 32 for coolant which extend through the bottom closure and are fixed thereto. Other support rods or tubes attached to and resting on the bottom closure and fixed to the bottom edge of tube 28 may be utilized to support the axial tube. The diameter of tube 28 in relation to shell 10 is selected so as to provide a substantial annular space 34 between the inner wall of the shell and the outer wall of the jacketed tube.

Tube 28 is provided with an axial stirrer and scraper 36 which comprises a helical-ribbon stirrer as shown, or may comprise an axial-screw stirrer. In either event, the helical screw 36 is provided with a scraper 38 supported by a rod or tube 40 extending vertically thru the helical members near the periphery thereof and attached to the scraper blades 38 by means of horizontal rods or tubes or other support means 42. The helical ribbons 36 terminate at the upper end in a peripheral horizontal ring 44 and at the lower end in a similar ring 46 to which they are welded or otherwise firmly fixed. An upper diametrically positioned plate 48 is welded to ring 44. Similarly, a diametrically positioned plate 50 connects with ring 46.

The annular scraper means comprises a plurality of upright tubes 52 suspended from diametrically positioned suspension arms 54 which are welded to an axial support element 56 which in turn is rigidly affixed to a rotatable shaft 58. Scraper blades 60 and 62 are supported from tubes 52 by means of rods or other supports 64. Shaft 58 extends through bearing member 66 and packing gland 68 to support means not shown but illustrated in connection with FIG. 3. Thus, the shaft 58 and scraper means rigidly fixed thereto are independently rotatable and supported from above closure member 12.

Axial stirrer 36 is supported from below bottom closure 16 by means of a shaft 70 extending through bearing 72 and packing gland 74 to a gear box 76 containing gear 78 (on shaft 70) and gear 80 on a shaft 82 connected with a motor or other prime mover 84. Shaft 70 extends through gear 78 into contact with a support bearing 86. It is to be understood that gear box 76 is rigidly supported and fixed with respect to shell 10. The helical-screw stirrer is provided with a centering means at the upper end comprising a stub shaft 88 which enters a recess in plate 90 welded or otherwise attached to element 56. The recess and shaft 88 are axially positioned with respect to shaft 58 and shaft 88 closely fits the recess in plate 90 but is free to rotate independently of said plate.

Referring to FIG. 2, scrapers 60 and 62 attached to upright arms 52 are shown in annulus 34. Scrapers 62 engage the outer wall of tube 28 while scrapers 60 engage the inner wall of shell 10. Two cross arms 54 are provided which support an upright tube 52 at each end, thereby providing four scraper assemblies in the annular scraper means, fixed with respect to each other and rotatable on the shaft 58 independently of the axial scraper means. Tubes 40 support scrapers 38 in engagement with the inner wall of axial tube 28 and extend through helical ribbon 36 to which they are fixed. The provision of four annular scraper arms and scraper blades for each reduces the number of revolutions required to obtain the desired scraping and efficiency of heat exchange on the walls of each jacket. However, the invention is not limited to this number of separate scraper blades or scraper arms, at least two being required, and more than four may be utilized, particularly in large-diameter reactors or heat exchangers.

Referring to FIG. 3, the structure of the axial impeller and scraper means and that of the annular scraper means are substantially identical to that shown in FIGS. 1 and 2. The difference lies principally in the support and hanging suspension of both the axial and the annular scraper means, separately and independently, from above top closure 12.

The axial impeller and scraper assembly is partially supported in bearing 72, which is welded to shell bottom 16 and provided with a cap 73. Rotational means for the axial impeller-scraper is provided by shaft 92 attached at its lower end to cross-plate 48 by means of reinforcing plate 94. A gear 96 on shaft 92 meshes with a drive gear 98 on a power shaft 100 to drive the axial impeller-stirrer assembly. Shaft 92 extends through bearing 102 for tubular shaft 104 and through support bearing 106 which is fixed to shaft 92 and rests on support means 108 supported from top closure 12 by means of a spider arrangement 110 and a second spider arrangement 112. A packing gland 114 between shafts 92 and 104 provides a seal to prevent escape of fluids from the apparatus which is operated under pressure. Any other type of seal may be utilized, such as a mechanical seal. As in FIG. 1, packing gland 68 provides a seal between the outer tubular shaft 104 and bearing 66 for the same purpose.

Rotating means for the annular scraper means comprises a gear 116 fixed to tubular shaft 104 which meshes with a gear 118 on a power shaft 120. The two scraper assemblies are independently supported and rotatable in the apparatus. It is feasible to support the axial impeller-scraper assembly completely on bearing 72 so that bearing 106 is merely a thrust bearing. However, as shown, element 106 is affixed to shaft 92 and is rotatable therewith on the bearing assembly supported on the top closure member.

Certain modifications of the invention will become apparent to those skilled in the art and the illustrative details disclosed are not to be construed as imposing unnecessary limitations on the invention.

We claim:
1. In a process for simultaneously mixing a viscous liquid material and effecting indirect heat exchange between said material and a fluid heat exchange medium employing a stirred scraped-surface polymerization apparatus comprising, in combination, (1) a jacketed cylindrical shell, (2) a fixed jacketed cylindrical tube within and concentric with said shell to thus define an annulus space between said tube and said shell and an axial space within said tube, (3) a scraper means rotatable within said annulus space and (4) an impeller means rotatable concentrically within said axial space independently of said scraper means wherein the improvement comprises: (a) introducing said viscous liquid material to said apparatus, (b) circulating said material through said axial space and said annulus space of said apparatus by rotating said impeller means at a speed in the range of 25 to 250 r.p.m., (c) circulating said heat exchange medium through the jackets of said shell and said tube, (d) rotating said scraper means within said annulus space such that the relative rotational speed of said impeller means to said scraper means is in the range of 2 to 100 times greater than the rotational speed of said scraper means, (e) withdrawing treated material from said apparatus, and (f) replenishing said material to maintain said apparatus liquid full.

2. The process of claim 1 wherein said material is an olefin polymer.

3. The process of claim 1 wherein said material is a polymer of at least one monomer of the group ethylene and propylene and mixtures thereof with 1-butene, formed by introducing polymerization catalyst, liquid solvent for said polymer, and selected monomer reactant into said apparatus under superatmospheric pressure sufficient to maintain monomer in solution and under reaction conditions while circulating coolant as said heat exchange medium.

4. The process of claim 3 wherein said catalyst consists essentially of chromium oxide, at least a portion of which is hexavalent, distended on a porous support of the group silica, alumina, zirconia, thoria, and mixtures thereof, and reaction conditions are controlled to maintain a normally solid polymer concentration in solution in said solvent in the range of about 20 to 50 percent by weight.

References Cited
UNITED STATES PATENTS

| | | | |
|---|---|---|---|
| 2,139,584 | 12/1938 | Hunter | 134—60 |
| 2,636,026 | 4/1953 | Nelson | 260—85.3 |
| 2,908,556 | 10/1959 | Watson | 23—263 |
| 2,964,391 | 12/1960 | Benson | 23—285 |
| 3,203,766 | 8/1965 | Mudd | 23—252 |
| 3,354,136 | 11/1967 | Crawford | 260—93.5 |
| 3,357,798 | 12/1967 | Yamashita | 23—285 |
| 3,438,952 | 4/1969 | Christensen | 260—83.7 |

JOSEPH L. SCHOFER, Primary Examiner

R. S. BENJAMIN, Assistant Examiner

U.S. Cl. X.R.

260—88.2 B, 92.8 R, 93.5 S, 93.7, 94.2 R, 94.9 D, 398; 106—219; 252—371; 23—288 K